United States Patent
Barker et al.

(10) Patent No.: US 9,116,524 B1
(45) Date of Patent: Aug. 25, 2015

(54) SYSTEM AND METHOD FOR VERTICAL NAVIGATION BASED ON GPS WAYPOINTS AND AUTOPILOT PROGRAMMING

(71) Applicant: Trutrak Flight Systems, Inc., Springdale, AR (US)

(72) Inventors: Andrew Barker, Fayetteville, AR (US); Lucas Massengale, Springdale, AR (US); Moss Foster, Fayetteville, AR (US)

(73) Assignee: TruTrak Flight Systems, Inc., Springdale, AR (US)

( * ) Notice: Subject to any disclaimer, the term of this patent is extended or adjusted under 35 U.S.C. 154(b) by 0 days.

(21) Appl. No.: 14/512,426

(22) Filed: Oct. 11, 2014

Related U.S. Application Data

(60) Provisional application No. 61/982,299, filed on Apr. 21, 2014.

(51) Int. Cl.

| | |
|---|---|
| G05D 1/00 | (2006.01) |
| G05D 1/04 | (2006.01) |
| G05D 1/06 | (2006.01) |
| G01C 21/20 | (2006.01) |
| G01S 19/01 | (2010.01) |
| G01S 19/38 | (2010.01) |
| G05D 1/08 | (2006.01) |
| G01C 23/00 | (2006.01) |

(52) U.S. Cl.
CPC .............. *G05D 1/0607* (2013.01); *G01C 21/20* (2013.01); *G01S 19/01* (2013.01); *G01S 19/38* (2013.01); *G05D 1/042* (2013.01); *G01C 23/00* (2013.01); *G05D 1/0061* (2013.01); *G05D 1/08* (2013.01); *G05D 1/0825* (2013.01)

(58) Field of Classification Search
CPC .......... G01C 23/00; G01C 5/005; G01C 5/06; G05D 1/0061; G05D 1/0607; G05D 1/0653; G05D 1/0858; G05D 1/08; G05D 1/0825; G01P 13/025
USPC ....................... 701/1, 3–12, 14–18, 120–122; 244/75.1, 76 R, 174–197, 220, 221; 340/945, 963–980
See application file for complete search history.

(56) References Cited

U.S. PATENT DOCUMENTS

| | | | |
|---|---|---|---|
| 3,875,379 A | * | 4/1975 | Vietor ........................... 701/121 |
| 4,012,626 A | | 3/1977 | Miller ........................ 235/150.26 |

(Continued)

OTHER PUBLICATIONS

Trutrak Flight Systems, "Operating Handbook for Sorcerer Autopilot" Web document downloaded Oct. 12, 2014.

*Primary Examiner* — Thomas Tarcza
*Assistant Examiner* — Tyler J Lee
(74) *Attorney, Agent, or Firm* — James Richards

(57) ABSTRACT

A system and method for achieving vertical navigation by using a satellite based navigation system exemplified by a GPS system and implementing the vertical navigation features in an autopilot unit interfaced to the satellite based navigation system. The autopilot reads waypoint information output from the satellite navigation system and receives VNAV altitudes and other commands from the pilot. The autopilot then performs VNAV calculations and guidance in accordance with the VNAV program. VNAV setup and progressive status are displayed on an economical small screen autopilot display. Modes are disclosed for exemplary GPS direct to waypoint VNAV, waypoint transition VNAV, multiple waypoint VNAV and other VNAV modes. Safety limits may be imposed on the VNAV program.

20 Claims, 8 Drawing Sheets

(56) References Cited

U.S. PATENT DOCUMENTS

| | | | |
|---|---|---|---|
| 5,945,943 A | 8/1999 | Kalafus et al. | 342/357 |
| 5,978,715 A * | 11/1999 | Briffe et al. | 701/11 |
| 6,038,498 A * | 3/2000 | Briffe et al. | 701/3 |
| 6,112,141 A * | 8/2000 | Briffe et al. | 701/14 |
| 6,182,927 B1 | 2/2001 | Galvin | 244/158 |
| 6,263,263 B1 * | 7/2001 | Shehi et al. | 701/3 |
| 6,308,116 B1 | 10/2001 | Ricks et al. | 701/11 |
| 6,342,853 B1 | 1/2002 | Kalafus et al. | 342/357.03 |
| 7,295,135 B2 | 11/2007 | Younkin | 350/971 |
| 7,962,253 B1 | 6/2011 | Owen et al. | 701/14 |
| 8,027,783 B2 | 9/2011 | Closse et al. | 701/120 |
| 8,321,071 B2 | 11/2012 | Klooster | 701/3 |
| 8,423,207 B2 | 4/2013 | Davis | 701/8 |
| 8,494,693 B2 | 7/2013 | Murphy | 701/18 |
| 2007/0203620 A1 * | 8/2007 | Gremmert | 701/9 |
| 2007/0239326 A1 * | 10/2007 | Johnson et al. | 701/9 |

\* cited by examiner

SYSTEM AND METHOD FOR VERTICAL NAVIGATION BASED ON GPS WAYPOINTS AND AUTOPILOT PROGRAMMING

RELATED APPLICATIONS

This patent application claims the benefit under 35 USC 119(e) of provisional patent application 61/982,299 titled System and Method for Vertical Navigation Based on GPS Waypoints and Autopilot Programming" filed Apr. 21, 2014 by Barker et al, which is incorporated herein by reference in its entirety.

FIELD OF THE INVENTION

The present invention pertains generally to the field of aircraft autopilot navigation, more particularly, vertical navigation as it pertains to autopilot guidance.

BACKGROUND

Vertical navigation is a tool that can reduce pilot work load and fatigue and thus improve flight safety, especially in a high work load procedure such as an instrument approach in the presence of severe weather. Vertical navigation is typically offered in low end systems in the form of a pitch attitude hold mode, or vertical rate mode or altitude select mode. Some autopilots offer an altitude limit alert. High end integrated systems, often termed Electronic Flight Information Systems (EFIS) may offer a vertical navigation feature between GPS waypoints as programmed into the EFIS. EFIS systems may combine GPS, heading and attitude gyro information, altimeter, and autopilot control in one large integrated computer screen display, often referred to as a "glass" display. EFIS systems can be quite expensive, out of the range of typical budgets for smaller aircraft. Thus, there is a need for improved vertical navigation capability in economical forms available to smaller aircraft.

BRIEF DESCRIPTION OF THE DISCLOSURE

Briefly, the present disclosure pertains to a system and method for achieving vertical navigation (VNAV) by using a satellite based navigation system exemplified by a GPS system and implementing the vertical navigation features in an autopilot unit interfaced to the satellite based navigation system. The autopilot reads waypoint information output from the satellite navigation system and receives VNAV altitudes and other commands from the pilot. The autopilot then performs VNAV calculations and guidance in accordance with the VNAV program. VNAV setup and progressive status are displayed on an economical small screen autopilot display. Modes are disclosed for exemplary GPS direct to waypoint VNAV, waypoint transition VNAV, multiple waypoint VNAV and other VNAV modes. Safety limits may be imposed on the VNAV program.

In one variation, the system may perform a "VNAV—Preset/store or immediate" mode comprising one or more of the steps:
Autopilot unit reads waypoint list from GPS stream.
Autopilot reads next waypoint.
Autopilot reads distance to next waypoint.
Autopilot receives input from pilot to set VNAV.
Autopilot sets display to receive target altitude input from pilot.
Autopilot receives target altitude from pilot and store command from pilot.
Autopilot sets display to receive beginning and ending waypoint from pilot. (Present aircraft position to current waypoint, or any two sequential waypoints in the list.)
Autopilot receives waypoints from pilot and store command from pilot.
Autopilot determines valid input and valid slope to waypoint.
Autopilot displays that a VNAV has been stored.
Autopilot continues any vertical mode guidance until reaching transition waypoint.
Autopilot controls aircraft attitude to follow slope to waypoint (using baro altimeter.)
Autopilot may check airspeed during slope.
Autopilot displays selected altitude and distance to waypoint during the transition.
Autopilot enters altitude hold mode upon reaching the last waypoint in the flight plan list.

In a further variation, the autopilot ma perform a "VNAV—Store while in VNAV transition" mode comprising one or more of the steps:
Autopilot unit reads waypoint list from GPS stream.
Autopilot reads next waypoint.
Autopilot reads distance to next waypoint.
Autopilot receives input from pilot to set Vnay.
Autopilot sets display to receive target altitude input from pilot.
Autopilot receives target altitude from pilot and store command from pilot.
Autopilot sets display to receive beginning and ending waypoint from pilot. (Present aircraft position to current waypoint, or any two sequential waypoints in the list.)
Autopilot receives waypoint selection from pilot and store command from pilot.
Autopilot determines valid input and valid slope to waypoint.
Autopilot displays that a VNAV has been stored.
Autopilot continues any vertical mode guidance until reaching transition waypoint.
Autopilot controls aircraft attitude to follow slope to waypoint (using baro altimeter.)
Autopilot may check airspeed during slope.
Autopilot displays selected altitude and distance to waypoint during the transition.
Autopilot allows repeat input for altitude and waypoints IF autopilot is currently in a VNAV transition.
Autopilot controls aircraft attitude to follow slope to each waypoint.
At transition waypoint, autopilot transitions to next slope for subsequent waypoint.
Autopilot enters altitude hold mode upon reaching the last waypoint in the flight plan list.

In a further variation, the system may perform a "VNAV—VNAV next leg" mode comprising one or more of the steps:
Autopilot unit reads waypoint list from GPS stream.
Autopilot reads next waypoint.
Autopilot reads distance to next waypoint.
Autopilot receives input from pilot to set VNAV.
Autopilot sets display to receive target altitude input from pilot.
Autopilot receives target altitude from pilot and store command from pilot.
Autopilot sets display to receive beginning and ending waypoint from pilot. (Present aircraft position to current waypoint, or any two sequential waypoints in the list.)
Autopilot receives waypoint selection from pilot and store command from pilot.

Autopilot determines valid input and valid slope to waypoint.

Autopilot displays that a VNAV has been stored.

Autopilot continues any vertical mode guidance until reaching transition waypoint.

Autopilot controls aircraft attitude to follow slope to waypoint (using baro altimeter.)

Autopilot may check airspeed during slope.

Autopilot displays selected altitude and distance to waypoint during the transition.

Autopilot allows repeat input for altitude and waypoints.

Autopilot controls aircraft attitude to follow slope to each waypoint.

At transition waypoint, autopilot transitions to next slope for subsequent waypoint.

Autopilot enters altitude hold mode upon reaching the last waypoint in the flight plan list.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EXEMPLARY EMBODIMENTS

Figure 1:
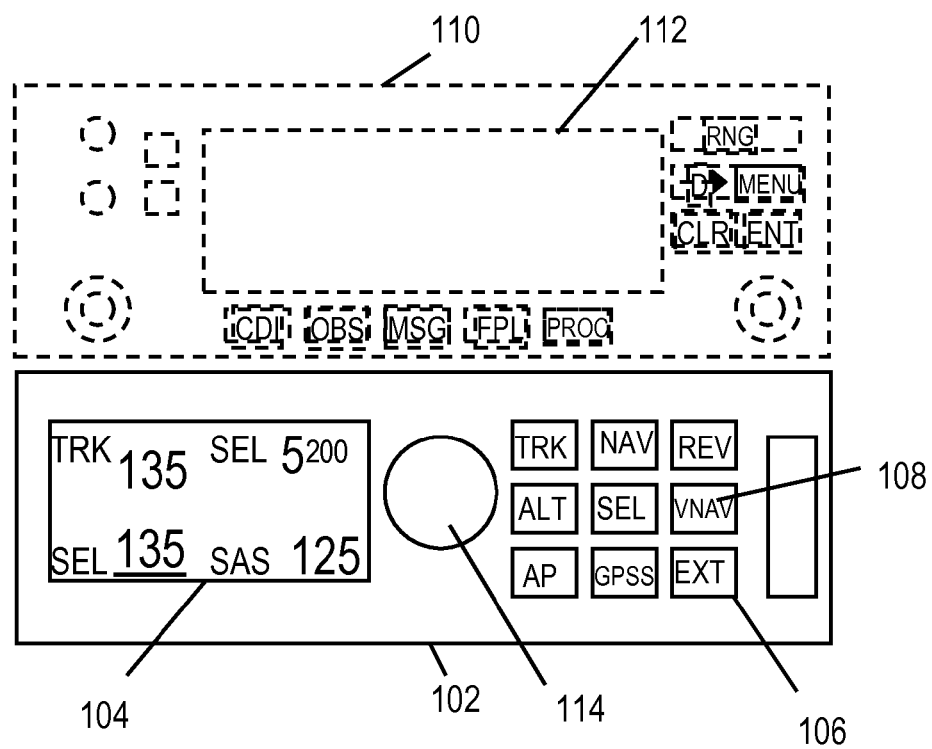
FIG. 1 illustrates an exemplary GPS and Autopilot programmer display in accordance with the present disclosure.

FIG. 1 illustrates an exemplary GPS 110 and Autopilot 102 in accordance with the present disclosure. The GPS unit itself is shown with dashed lines because the GPS unit is separate from the invention, although GPS data may be used by the invention. The GPS unit 110 may be typically a legacy GPS and may be independently (separate from the autopilot) purchased and installed in the aircraft. The GPS unit typically has a digital output, typically RS232 or other standard signaling that provides:

List of lateral navigation waypoints programmed by the pilot in the GPS,

Next waypoint,

Distance to next waypoint, and

Lateral guidance to the autopilot in the form of course deviation or GPS steering. The GPS may also include a pilot interface 112 for programming GPS lateral modes and waypoints and display of status and other information.

The term GPS refers to the Global Positioning System, a space based satellite navigation system comprising a constellation of satellites providing positioning and timing signals. As used in this disclosure, GPS exemplifies a more general concept of a satellite based navigation system. Where the term GPS is used, it is intended to refer generally to a space based satellite navigation system. Other systems may be substituted, such as the Russian Global Navigation System (GLONASS) or European Galileo. The term GPS is also intended to include enhancements and improvements such as WAAS, EGNOS, and OCX.

The autopilot (alternatively referred to as autopilot system) 102 is configured for use with the GPS 110 by receiving and using the GPS digital data provided by the GPS. The autopilot 102 may be packaged to be independently purchased and installed in the aircraft and may be connected to any GPS with a suitable digital output. The autopilot may include, an autopilot computer, a pilot interface—alternatively called a programmer, and servo drivers. In one variation, the autopilot may be considered to include the servos. The autopilot may utilize an external gyro, altimeter, or airspeed information or may include these devices in the autopilot unit. The autopilot unit may comprise multiple housings for space saving in the panel; however, modern electronics typically allows the entire autopilot (except servos) to be housed in the autopilot package 102 with the programmer and located in the panel. The autopilot may also include interfaces for heading bug or course deviation indicator signals. The autopilot in accordance with the present disclosure does not include a GPS receiver 110 or GPS pilot interface 112 for entering waypoints. The autopilot may, however, receive signals from the GPS receiver 110. The autopilot programmer may have several knobs and buttons for pilot entry of information including but not limited to a VNAV button 108 for selecting VNAV setup modes, a selector knob 114 for adjusting values or stepping through lists, and an EXT button 106 for exiting modes.

Figure 2:
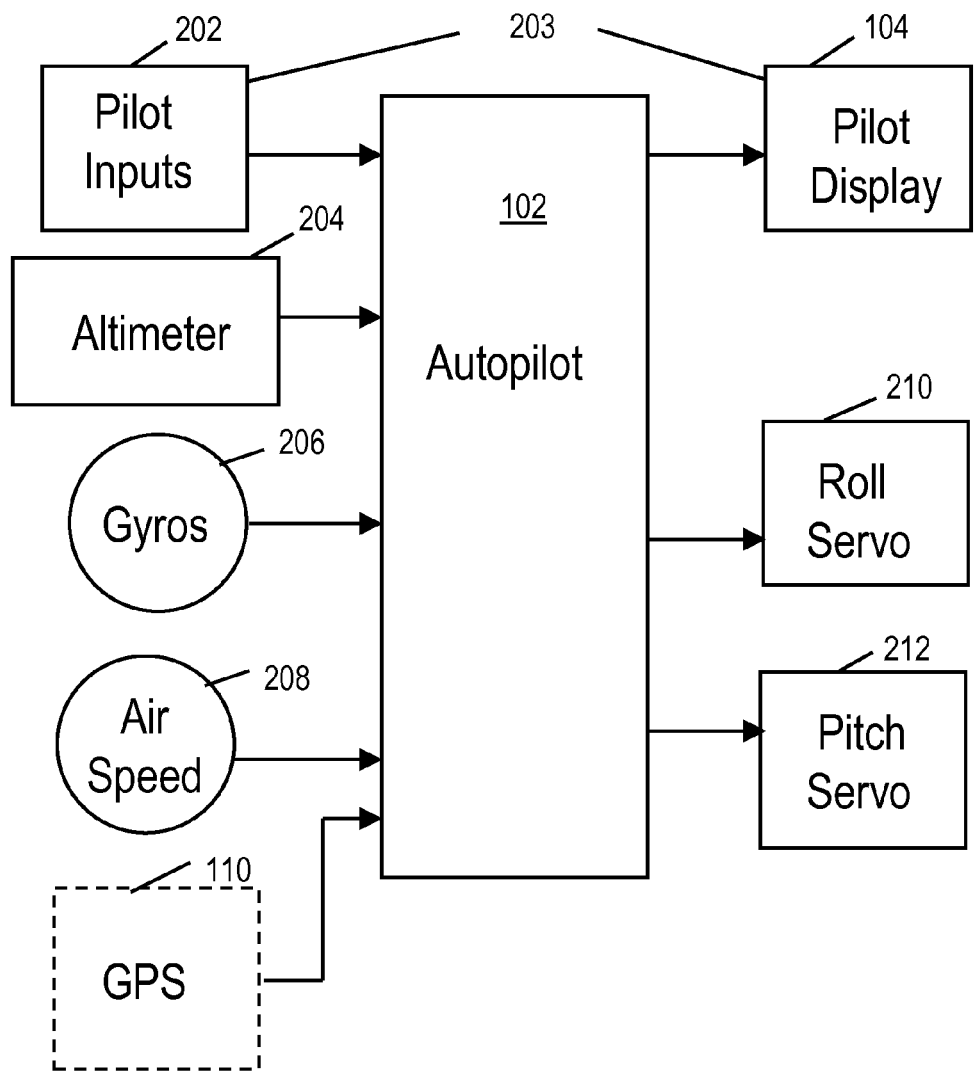
FIG. 2 illustrates an exemplary autopilot configuration in accordance with the present disclosure.

FIG. 2 illustrates an exemplary autopilot configuration in accordance with the present disclosure. The autopilot 102 is shown having external interfaces for an autopilot programmer 203 comprising pilot inputs 202 and a pilot display 104. The interfaces may also include an external altimeter 204, external gyros 206, external air speed indicator 208, and external GPS 110. The autopilot may be configured to display GPS waypoint information and flight status on the pilot display 104 and to interpret pilot input information to generate an autopilot and VNAV program. The autopilot may then processes the instrument inputs to generate control signals to the pitch servo 210 and roll servo 212.

Figure 3:
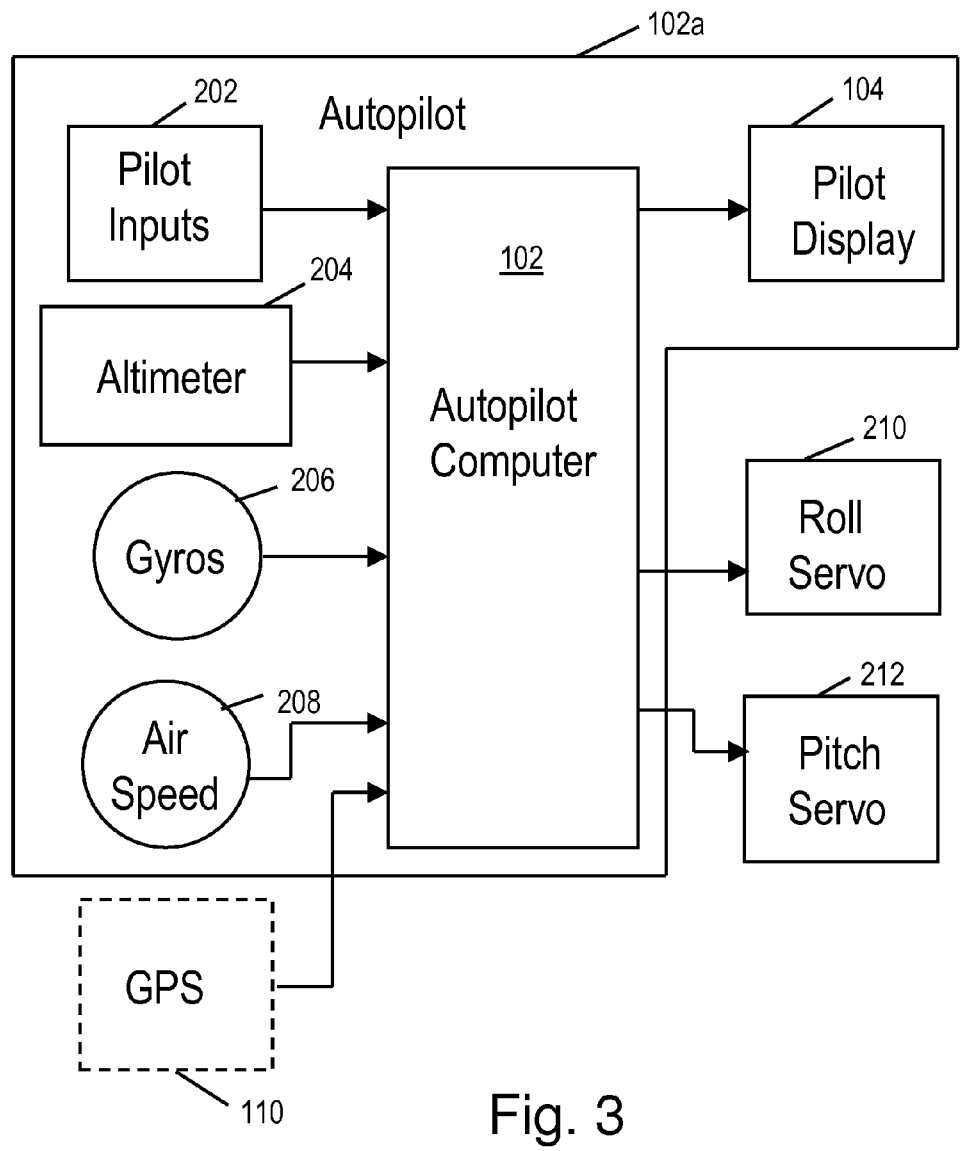
FIG. 3 illustrates an alternative exemplary autopilot configuration.

FIG. 3 illustrates an alternative exemplary autopilot configuration. The alternative autopilot 102a may include one or more of the sensors integrated into the autopilot unit (physical package). As shown, the autopilot programmer 203, comprising the pilot input devices 202 and pilot display 104, is integrated into the autopilot unit 102a. The autopilot unit may be a typical standard size for mounting on the aircraft instrument panel. The altimeter and airspeed are shown as being integrated into the autopilot. In one variation, the altimeter and airspeed may be separate and independent sensors from the pilot's altimeter and airspeed, receiving pilot and static air pressure inputs and producing altitude and airspeed information derived from pressure signals for use by the autopilot. There may be no display of altitude or airspeed on the autopilot. Thus, low cost or existing mechanical altimeters and airspeed indicators may be used for pilot display that have no electronic output, thus permitting the autopilot to be installed in an existing aircraft without requiring new altimeters or airspeed indicators.

Similarly, the heading and vertical gyro functions may be integrated into the autopilot. The gyro signals may be synthesized from compact angle rate sensors and again may be used solely for autopilot operation and not displayed to the pilot. Conventional air driven or electric gyros may be used for pilot display and operation. Thus, the autopilot may be installed in aircraft without having to change the gyros to a model having a digital output.

Figure 4A:
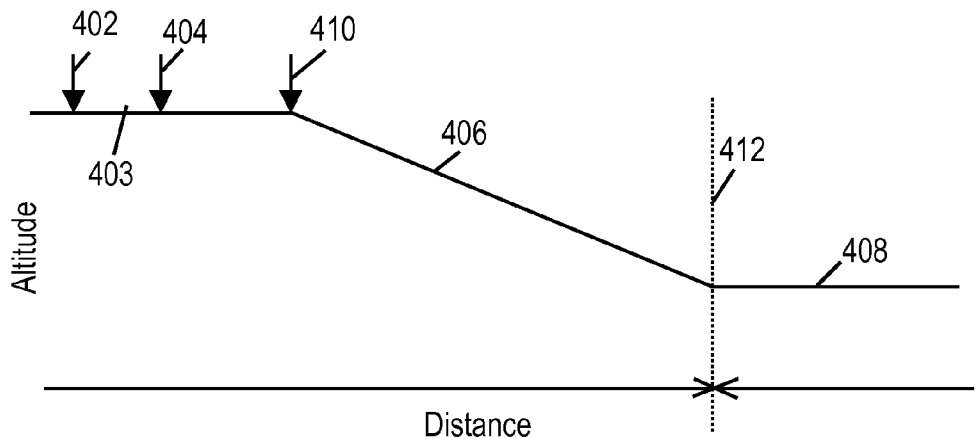
FIG. 4A illustrates an exemplary flight profile utilizing vertical navigation.

FIG. 4A illustrates an exemplary flight profile utilizing vertical navigation. FIG. 4A illustrates altitude as a function of distance along a track. Referring to FIG. 4A, the aircraft is initially at altitude 403. At point 402 the pilot enters waypoint 412 into the GPS using the GPS programmer. At point 404, the pilot presses the VNAV button 108 on the autopilot programmer. The autopilot reads the data from the GPS and displays waypoint 412 and distance to waypoint on the Autopilot programmer. The autopilot programmer highlights or underlines the altitude and invites the pilot to set the selected altitude. The pilot sets the selected altitude at the waypoint by turning the selector knob (alternatively up-down buttons may be used). At point 410, the pilot presses the store button on the autopilot (presses the selector knob 114) and the VNAV program begins to execute. The autopilot computes the slope or descent rate and controls the aircraft along the slope 406. The slope may be continuously recomputed and controlled. The pilot remains responsible for aircraft power and airspeed control. The autopilot may also observe airspeed and enforce airspeed limits by dipping the nose near stall speed and raising the nose near Vne. A minimum and maximum safe autopilot speed may be entered into the autopilot during autopilot setup to define these limits. Audio and/or flashing alarms may be triggered when the autopilot cannot control to the desired slope 406. Upon reaching the waypoint 412, the autopilot holds selected altitude 408. Upon reaching the waypoint 412, the autopilot enters altitude hold mode at altitude 408.

Figure 4B:
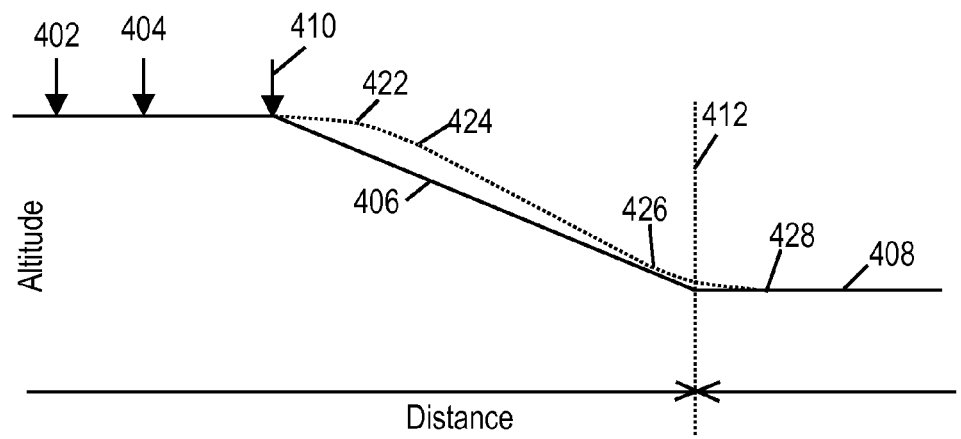
FIG. 4B shows further details relating to FIG. 4A.

FIG. 4B shows further details relating to FIG. 4A. Referring to FIG. 4B, the pilot stores the target altitude value and initiates VNAV at point 410. The autopilot then begins to track the initially computed slope 406, however, the pitch down is not instant, but is gradual following arc 422. The slope to waypoint is recomputed during the arc 422 and when the slope or descent rate meets the required slope the descent follows new slope 424 toward the waypoint 412. Upon nearing the waypoint, at point 426, the autopilot may begin to roll out to intercept the target altitude at point 428 without undershooting the target altitude 408.

Programming the VNAV

If the GPS has a flight plan or a direct to programmed in, pressing the VNAV button will enter the VNAV setup mode. (In the absence of a GPS waypoint, the VNAV setup may revert to a fixed altitude and distance VNAV setup.) The first line in the VNAV setup mode is where the target altitude is entered. The second line where the beginning and ending waypoints are displayed. The target altitude is associated with the right hand, ending waypoint. Pressing "enter" (pressing the selector knob 114) stores the entered altitude with the ending waypoint for the displayed leg. The user also has the option of beginning the VNAV immediately from the aircraft present position to the next waypoint in the list. (This is the only mode that would be available with a direct to, because there is no beginning waypoint available.)

The user enters the desired ending altitude of the VNAV and enters this information by pressing the knob 114 (enter) to set the target altitude. The curser (underline) then moves to the bottom line to allow selection of the associated leg. The knob may be rotated to select the desired leg for the altitude. The beginning and ending waypoints for the selected leg are shown on the bottom line. Once the desired waypoints are selected, the user again presses the knob. This will store the VNAV program and the autopilot home screen will show a V next to the flashing + to indicate that a VNAV is stored. Additional waypoint altitudes may be stored by repeating the process. Previous altitudes are not erased by programming more waypoints.

No further input is required from the user, the transition will begin automatically when the first waypoint is crossed. It does not matter what vertical mode the autopilot is in prior to entering the VNAV setup, nor does it matter the vertical mode when the waypoint is crossed.

Another feature is that once a transition begins, another VNAV may be stored. This allows for multiple step-downs in a row from multiple consecutive waypoints.

Once each waypoint is crossed, including the last waypoint, the autopilot enters altitude hold mode.

To cancel a stored VNAV, the user simply presses the EXT button.

There are a few cases where the mode may be disabled: for example, the loss of GPS signal, or canceling flight plan, or inserting a waypoint between the two selected waypoints could result in erasing the VNAV program and reverting to, for example, altitude hold mode.

To assist the pilot in following automatic mode changes, there may be audio alerts and visual alerts to certain actions, for example, the storing, canceling, and beginning a VNAV.

Example Approach

FIG. 5A-FIG. 5E illustrate the autopilot display during an exemplary approach.

Figure 5A:
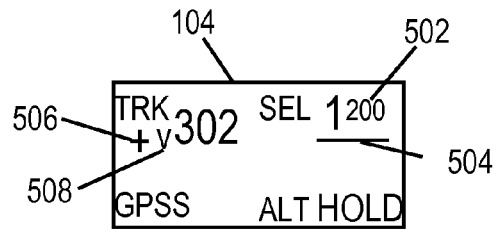
FIG. 5A-FIG. 5F illustrate the autopilot display during an exemplary approach.
Figure 5B:
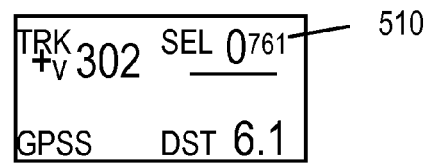
Figure 6:
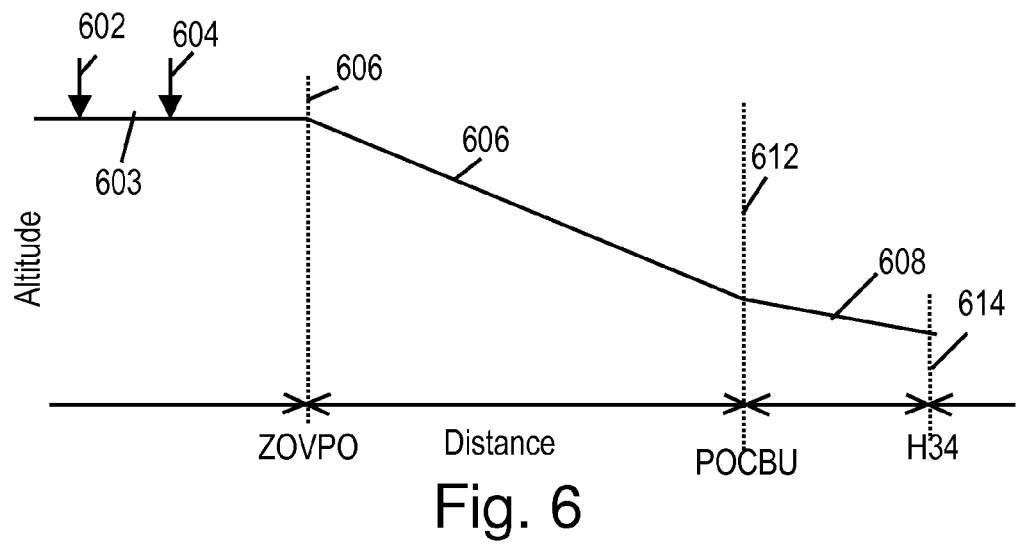
FIG. 6 illustrates an altitude profile during an exemplary approach.

FIG. 6 illustrates an altitude profile during an exemplary approach. Referring to the figures, FIG. 5A illustrates the autopilot display at point 602 in FIG. 6. The aircraft is operating in altitude hold mode at 1200 meters altitude 603, 502 ready to set up for the VNAV approach. The lateral mode is GPS steering (GPSS). The GPS has been programmed to follow a flight plan comprising waypoints ZOVPO (PPOA) 606 to POCBU 612 to H34 614. The aircraft is approaching ZOVPO 606. GPS track is engaged (indicated by "+" 506) and the VNAV is programmed (indicted by "V" 508) for 761 meters altitude 510 at the next waypoint, POCBU. FIG. 5B shows the display upon crossing ZOVPO. The new altitude is 761 meters 510. The distance to POCBU is 6.1 km. The cursor is on altitude select indicating that rotating the knob 114 will change the target altitude 510.

Figure 5C:
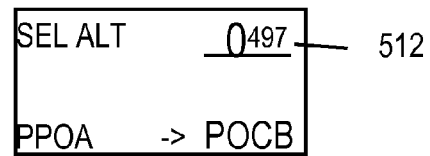
Figure 5D:
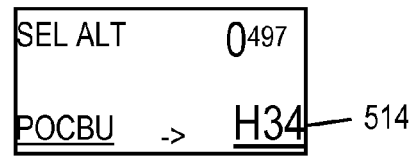
Figure 5E:
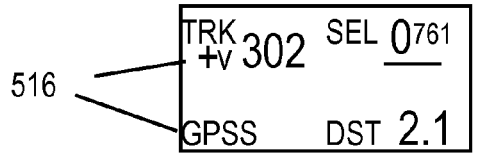
Figure 5F:
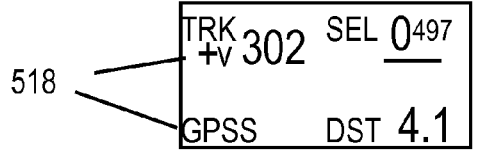

FIG. 5C shows the display at point 606. At point 606, the pilot decides to set VNAV for the next leg while in VNAV for the current leg. The pilot presses the VNAV button 108 on the autopilot. The autopilot displays as in FIG. 5C showing "Sel ALT" and the cursor (underline) under the altitude value. The pilot rotates the knob to select altitude 497 meters 512. The bottom row displays the current leg from ZOVPO to POCBU. The pilot presses the knob 114 to fix (store) the value 497. Pressing the knob 114 also moves the cursor to the bottom row to select the leg as shown in FIG. 5D. The pilot then rotates the knob 114 to select the leg from POCBU to H34 514. Rotating the knob 114 moves through the list of waypoints, leg by leg, showing the starting waypoint on the left and the ending waypoint on the right. The pilot then pushes the knob 114 to associate the 497 altitude with the ending waypoint in the leg POCBU to H34 514. The autopilot then stores these values and reverts to status display FIG. 5E. FIG. 5E shows 2.1 km to next waypoint POCBU (displayed on GPS) at target altitude 761 m. Upon crossing POCBU 612, the autopilot follows slope 608 and displays the new target altitude 497 and distance to the new waypoint H34 shown in FIG. 5F.

Autopilot System

Figure 7:
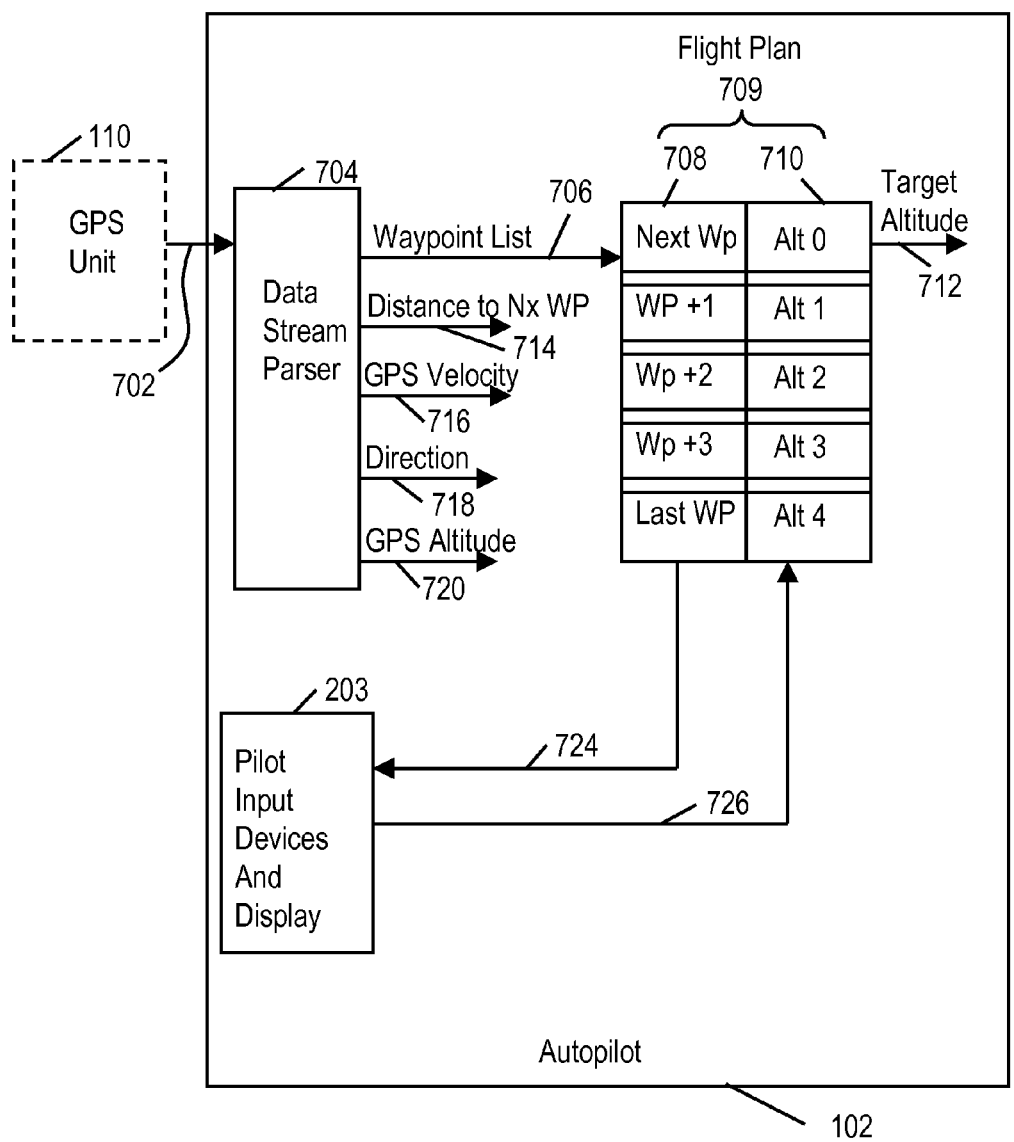
FIG. 7 illustrates an exemplary VNAV waypoint list function in the exemplary autopilot.

FIG. 7 illustrates an exemplary VNAV waypoint list function in the exemplary autopilot. Referring to FIG. 7, the GPS unit 110 provides digital data to the autopilot 102. An exemplary interface 702 may include ARINC and/or serial RS-232 data. Other data interfaces may be used. The input data is processed by a parser 704 to separate the variables. The variables may typically include the waypoint list 706 previously programmed into the GPS 110 by the pilot. The data may also include a distance 714 to the next waypoint. The ID of the next waypoint. A GPS velocity 716, which may be a ground speed measurement or other velocity. The GPS may also report a course direction 718 and may report a GPS derived altitude 720. Numerous other variables may also be provided and may be available for use by the autopilot.

The waypoint list 708 is stored in a table (array 709) with associated target altitudes 712, which may be entered by the pilot using the autopilot programmer. The pilot may enter a target altitude associated with each waypoint by pressing the VNAV button and beginning the VNAV setup process. Button sequences are available at the autopilot programmer 203 to set, reset, review, and delete 706 any altitude associated with any waypoint. The waypoints themselves may not be set using the autopilot programmer, but are established by setting the GPS flight plan in the GPS unit. The waypoints may be displayed 724 on the autopilot programmer display 203. Of particular interest is the target altitude 712 associated with the next waypoint. This altitude is used for the current VNAV calculation.

Figure 8:
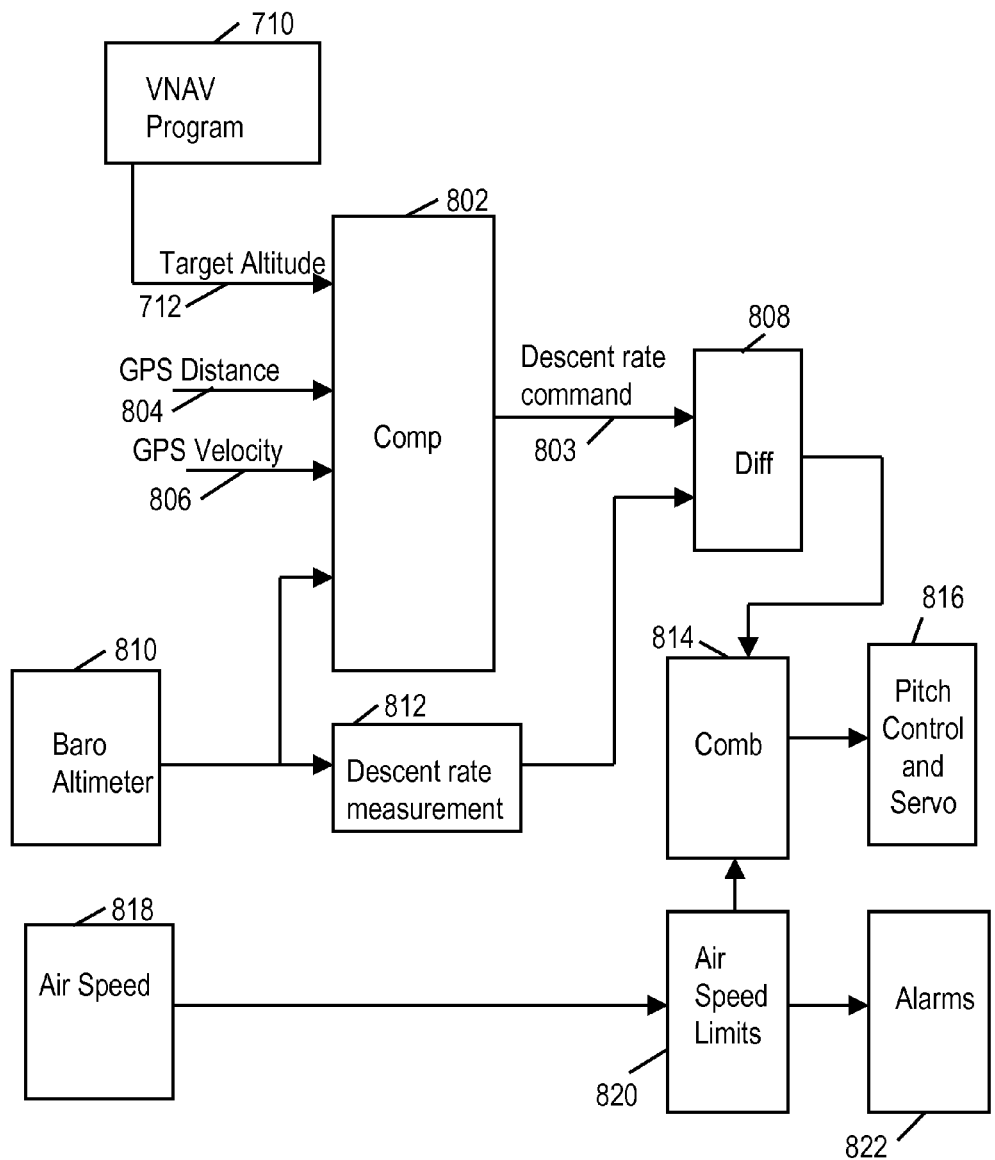
FIG. 8 illustrates an exemplary VNAV calculation and control performed by the autopilot.

FIG. 8 illustrates an exemplary VNAV calculation and control performed by the autopilot. The target altitude 712 for the current next waypoint is fed to the VNAV computation unit 802, which may be a program running on an autopilot computer. In the VNAV computation, target altitude 712 is compared with the current barometric altitude measurement from a barometric altimeter 810. The difference indicates the total altitude to be lost or gained. GPS distance to the waypoint 804 and GPS velocity 806 can be used to estimate the time to the waypoint. Thus, the altitude difference over the time to go represents the sink (or climb) rate necessary and can be output as a sink or climb command 803. The barometric altimeter readings are also processed to determine a sink or climb rate measurement 812, which is compared with the desired rate 803 from the VNAV computation. The difference 808 is then used to drive the servo 816 to adjust pitch attitude to reduce the difference and control the aircraft to the desired sink or climb rate. Thus, a desired descent rate may be determined in accordance with:

$$\frac{dH_{VNV}}{dt} = \frac{H_{Baro} - H_{Tgt}}{D_{wp}/V_{gs}},$$

where, $dH_{VNV}/dt$ is the desired VNAV vertical rate (descent/climb rate);

$H_{Baro}$ is the measured barometric altitude;

$H_{Tgt}$ is the target altitude at the next waypoint;

$D_{wp}$ is the GPS distance to the next waypoint; and $V_{gs}$ is the GPS ground speed measurement.

Control may be derived by comparing measured descent rate with desired descent rate:

$$\dot{\theta}_{Comm} = (dH_{VNV}/dt) - (dH_{Baro}/dt),$$

where, $\dot{\theta}_{Comm}$ is a pitch rate command signal to a pitch servo control loop, $(dH_{VNV}/dt)$ is the desired VNAV vertical rate computed above; and $(dH_{Baro}/dt)$ is the measured vertical rate derived from barometric data.

The calculation should be repeated at a suitable rate to maintain control of the aircraft and maintain target limits within safety tolerances. For example, a half second repetition rate may be sufficient. GPS readings may be available at one to two second intervals, which should be sufficient for commanding aircraft pitch attitude. Pitch attitude control may have a faster update rate based on gyro information.

Alternatively, a slope profile may be determined and fixed at the start of VNAV and the autopilot may use distance to waypoint and altitude to determine position high or low from the slope profile and then control pitch to maintain and track the fixed profile.

When the aircraft is not using auto-throttle, it is the pilot's responsibility to operate the throttle to keep the aircraft at the desired air speed. As shown in FIG. 8, the system may optionally observe air speed 818 to determine if the air speed is higher than a minimum air speed or less than a maximum air speed to maintain safe operation of the aircraft. If the airspeed triggers the airspeed limits 820 the signal may be delivered to a combiner 814 permitting the pitch attitude to be raised or lowered to keep the airspeed within limits, thus deviating from the VNAV profile in the interest of safety. The pilot may be notified by an alarm 822, for example a flashing display and/or audio alert or other alert when such action is taken.

CONCLUSION

One should understand that numerous variations may be made by one skilled in the art based on the teachings herein. Such variations include but are not limited to variations in label text, placement and size of controls, and number of controls. The exact function of controls may be varied within a class of similar functions.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for providing aircraft vertical navigation comprising:

an autopilot system configured for combining gyro information, barometric altitude information, and GPS navigation information to produce servo control signals for controlling said aircraft, said autopilot system not including a GPS receiver;

said autopilot system configured for receiving a data stream from a GPS receiver separate from said autopilot system, said data stream comprising waypoint information said waypoint information comprising at least one waypoint entered in said GPS receiver, said data stream further comprising aircraft velocity information and a distance to said at least one waypoint;

said autopilot system comprising an autopilot programmer, said autopilot system configured for displaying said at least one waypoint to a pilot using said autopilot programmer and for receiving a target altitude from said pilot and associating said target altitude associated with said at least one waypoint;

said autopilot system configured for determining an altitude difference by comparing said target altitude with said barometric altitude information;

said autopilot system configured for calculating a vertical rate or slope by combining said distance to said at least one waypoint, said aircraft velocity information, and said altitude difference;

said autopilot system configured for controlling said aircraft to fly in accordance with said vertical rate or said slope.

2. The autopilot system in accordance with claim 1, further including a first input device configured for said pilot to command said autopilot system to enter a vertical navigation input mode for entry of vertical navigation parameters.

3. The autopilot system in accordance with claim 2, further including a second input device configured for setting a target altitude; said autopilot system configured for displaying an altitude input value responsive to pilot input and displaying a cursor at said altitude input value on said autopilot programmer when said autopilot system is in said vertical navigation input mode.

4. The autopilot system in accordance with claim 3, further including a third input device; said autopilot system configured for displaying a cursor at a waypoint display on said autopilot programmer when in said vertical navigation input mode, said autopilot system configured for changing a displayed waypoint in response to said pilot activating said third input device.

5. The autopilot system in accordance with claim 4, wherein the second input device and the third input device are the same physical device.

6. The autopilot system in accordance with claim 5, wherein the second input device is a rotary selector.

7. The autopilot system in accordance with claim 6, wherein the second input device is pushed to store the altitude input value as the target altitude.

8. The autopilot system in accordance with claim 1, wherein the autopilot system is configured to display an indication that vertical navigation mode is active.

9. The autopilot system in accordance with claim 1, wherein the autopilot system is configured to display said at least one waypoint and said distance to said at least one waypoint.

10. A method for providing aircraft vertical navigation comprising:

an autopilot system receiving flight plan information from a satellite navigation system, said satellite navigation system being separate from said autopilot system, said flight plan information entered by a pilot into said satellite navigation system, said flight plan information comprising at least one waypoint;

said autopilot system further receiving aircraft velocity information and a distance to said at least one waypoint from said satellite navigation system;

said autopilot system displaying said at least one waypoint to said pilot using an autopilot programmer, and said autopilot system receiving a target altitude from said pilot using said autopilot programmer and associating said target altitude with said at least one waypoint;

said autopilot system calculating a vertical rate or slope by combining said distance to said at least one waypoint and said aircraft velocity information with barometric altitude information and said target altitude associated with said at least one waypoint;

said autopilot system controlling said aircraft to fly in accordance with said vertical rate or said slope.

11. The method in accordance with claim 10, further comprising:
recalculating said vertical rate or said slope before reaching said at least one waypoint.

12. The method in accordance with claim 10, further comprising: said autopilot computing a subsequent vertical rate or slope for a subsequent waypoint after crossing said at least one waypoint.

13. The method in accordance with claim 10, further comprising:
changing said target altitude for said at least one waypoint while flying in accordance with said vertical rate or said slope toward said at least one waypoint.

14. The method in accordance with claim 10, further comprising:
calculating a vertical rate for a subsequent waypoint after reaching said at least one waypoint.

15. The method in accordance with claim 10, further including steps after said autopilot displaying said at least one waypoint:
said autopilot system receiving an input from said pilot commanding entry of vertical navigation information; said autopilot system displaying a cursor indicating altitude entry mode; said autopilot system receiving altitude setting information; and said autopilot system receiving indication of completed entry.

16. The method in accordance with claim 15, wherein said step of receiving altitude information comprises receiving altitude information from a rotary input device.

17. The method in accordance with claim 10, wherein said vertical rate or slope is a climb rate or climb slope.

18. The method in accordance with claim 10, further comprising:
said autopilot system displaying a cursor at a waypoint display for indicating waypoint selection mode;
said autopilot system placing said cursor at a first waypoint; said autopilot system receiving a "store" input from said pilot while said cursor is at said first waypoint; and said autopilot system associating said target altitude with said selected waypoint in response to said "store" command.

19. The method in accordance with claim 10, wherein said flight plan information comprises a waypoint list, said waypoint list comprising a last waypoint, said method further comprising: said autopilot entering altitude hold mode upon transitioning said last waypoint.

20. The method in accordance with claim 10, further comprising:
said autopilot system displaying an indication that vertical navigation mode is active.

* * * * *